(12) United States Patent
Wickstead et al.

(10) Patent No.: US 8,922,203 B2
(45) Date of Patent: Dec. 30, 2014

(54) TURBOMACHINE BLADE MONITORING SYSTEM

(75) Inventors: Kristoffer Wayne Wickstead, Carson City, NV (US); Samuel Thomas Walter Francis, Minden, NV (US); Jesse Lewis Hanna, Gardnerville, NV (US); Sherrie Ann Clark, Solon, OH (US)

(73) Assignee: General Electric Company, Schenectady, NY (US)

( * ) Notice: Subject to any disclaimer, the term of this patent is extended or adjusted under 35 U.S.C. 154(b) by 258 days.

(21) Appl. No.: 13/351,187

(22) Filed: Jan. 16, 2012

(65) Prior Publication Data
US 2013/0181699 A1 Jul. 18, 2013

(51) Int. Cl.
*G01B 7/30* (2006.01)

(52) U.S. Cl.
USPC ................................ 324/207.25; 324/207.13

(58) Field of Classification Search
CPC .......................................................... G01B 7/30
USPC ................................................... 324/207.25
See application file for complete search history.

(56) References Cited

U.S. PATENT DOCUMENTS

| | | | |
|---|---|---|---|
| 3,593,127 A | 7/1971 | Lucka | |
| 4,413,519 A | 11/1983 | Bannister et al. | |
| 4,887,468 A | 12/1989 | McKendree et al. | |
| 4,896,537 A | 1/1990 | Osborne | |
| 5,152,172 A | 10/1992 | Leon et al. | |
| 5,479,826 A | 1/1996 | Twerdochlib et al. | |
| 5,511,426 A | 4/1996 | Clement et al. | |
| 5,572,119 A | 11/1996 | Taylor | |
| 5,761,956 A | 6/1998 | Beeson et al. | |
| 2005/0218887 A1 | 10/2005 | Twerdochlib | |
| 2005/0288907 A1* | 12/2005 | Kulczyk et al. | ............... 702/189 |
| 2009/0177363 A1* | 7/2009 | Kulczyk et al. | ............... 701/100 |
| 2011/0295538 A1 | 12/2011 | Andarawis et al. | |

FOREIGN PATENT DOCUMENTS

| | | |
|---|---|---|
| EP | 0602423 A1 | 6/1994 |
| EP | 0465696 B1 | 12/1995 |
| EP | 0620423 B1 | 2/1997 |
| EP | 0765466 B1 | 10/1999 |

OTHER PUBLICATIONS

Search Report and Written Opinion from EP Application No. 13151345.9 dated Mar. 27, 2013.

* cited by examiner

*Primary Examiner* — Bot Ledynh
(74) *Attorney, Agent, or Firm* — Fletcher Yoder, P.C.

(57) ABSTRACT

Embodiments of the present disclosure are directed toward a system that includes a turbomachine blade monitoring system having an eddy current proximity probe assembly. The eddy current proximity probe assembly includes an eddy current proximity probe having a probe tip and a probe tip shroud disposed about the probe tip, wherein the probe tip shroud comprises a non-metallic material. The eddy current proximity probe is configured to provide a signal indicative of a presence of a turbomachine blade, wherein the eddy current proximity probe assembly is configured to be disposed within a turbomachine casing. The turbomachine blade monitoring system also includes a monitor coupled to the eddy current proximity probe assembly, wherein the monitor is configured to monitor a parameter of the turbomachine blade based on the signal.

16 Claims, 4 Drawing Sheets

TURBOMACHINE BLADE MONITORING SYSTEM

BACKGROUND OF THE INVENTION

The subject matter disclosed herein relates to turbomachines, and, more particularly, to an improved blade monitoring system for turbomachines.

Turbomachines include compressors and turbines, such as gas turbines, steam turbines, and hydro turbines. Generally, turbomachines include a rotor, which may be a shaft, drum, disk, or wheel to which turbomachine blades are attached. Turbomachines may include blade monitoring systems to monitor degradation of the turbomachine blades.

Existing blade monitoring systems may include magnetic pickup type transducers. However, magnetic pickup type transducers may be susceptible to various weaknesses. For example, magnetic probes can exhibit very low signal amplitude at low turbine blade speeds and very high signal amplitudes at high turbine blade speeds. Additionally, magnetic pickup probes are susceptible to, and also induce, magnetic fields. Furthermore, magnetic pickup probe performance may be degraded due to thermal or mechanical stresses, or both.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbomachine blade monitoring system having an eddy current proximity probe assembly. The eddy current proximity probe assembly includes an eddy current proximity probe having a probe tip and a probe tip shroud disposed about the probe tip, wherein the probe tip shroud comprises a non-metallic material. The eddy current proximity probe is configured to provide a signal indicative of a presence of a turbomachine blade, wherein the eddy current proximity probe assembly is configured to be disposed within a turbomachine casing. The turbomachine blade monitoring system also includes a monitor coupled to the eddy current proximity probe assembly, wherein the monitor is configured to monitor a parameter of the turbomachine blade based on the signal.

In a second embodiment, a system includes a turbomachine having a blade that rotates along a surface and an eddy current proximity probe assembly disposed in a receptacle along the surface. The eddy current proximity probe assembly has an eddy current proximity probe having a probe tip configured to provide a signal indicative of a presence of the blade along the surface and a probe tip shroud disposed about the probe tip, wherein the probe tip shroud comprises a non-metallic material that substantially fills a void about the probe tip along the surface.

In a third embodiment, a system includes an eddy current proximity probe assembly including an eddy current proximity probe having a probe tip, a probe case disposed at least partially about the eddy current proximity probe, and a probe sheath at least partially disposed about the probe case, wherein the probe sheath is coupled to the probe case by a first threaded connection. The eddy current proximity probe assembly further includes a probe tip shroud disposed about the probe tip, wherein the probe tip shroud is coupled to the probe case by a second threaded connection, and the probe tip shroud comprises a non-metallic material.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are directed towards a blade monitoring system configured to monitor turbomachine blades of a turbomachine. The blade monitoring system includes a probe assembly disposed within a casing of the turbomachine. More specifically, the probe assembly includes a probe (e.g., an eddy current proximity probe) having a probe tip surrounded by a probe tip shroud. The probe tip shroud is formed from a non-metallic material, such as carbon fiber, polyphenyline sulfide, fiberglass, PEEK, or other plastics, and may extend from a probe sheath surrounding the probe to an inner wall of the turbomachine casing when the probe assembly is disposed within the casing. In this manner, the probe tip shroud fills an air void that would otherwise exist between the probe tip and the turbomachine casing when the probe assembly is installed in the turbomachine casing. By filling the air void that would otherwise exist between the probe tip and the turbomachine casing with a non-metallic probe tip shroud, eddy current probes may be used to monitor turbomachine blade without increasing flow disturbances within the turbomachine. While the embodiments disclosed below are directed towards a blade monitoring system used with a gas turbine, it is important to note that the blade monitoring system may be used with other turbomachines, such as steam turbines or compressors.

Figure 1:
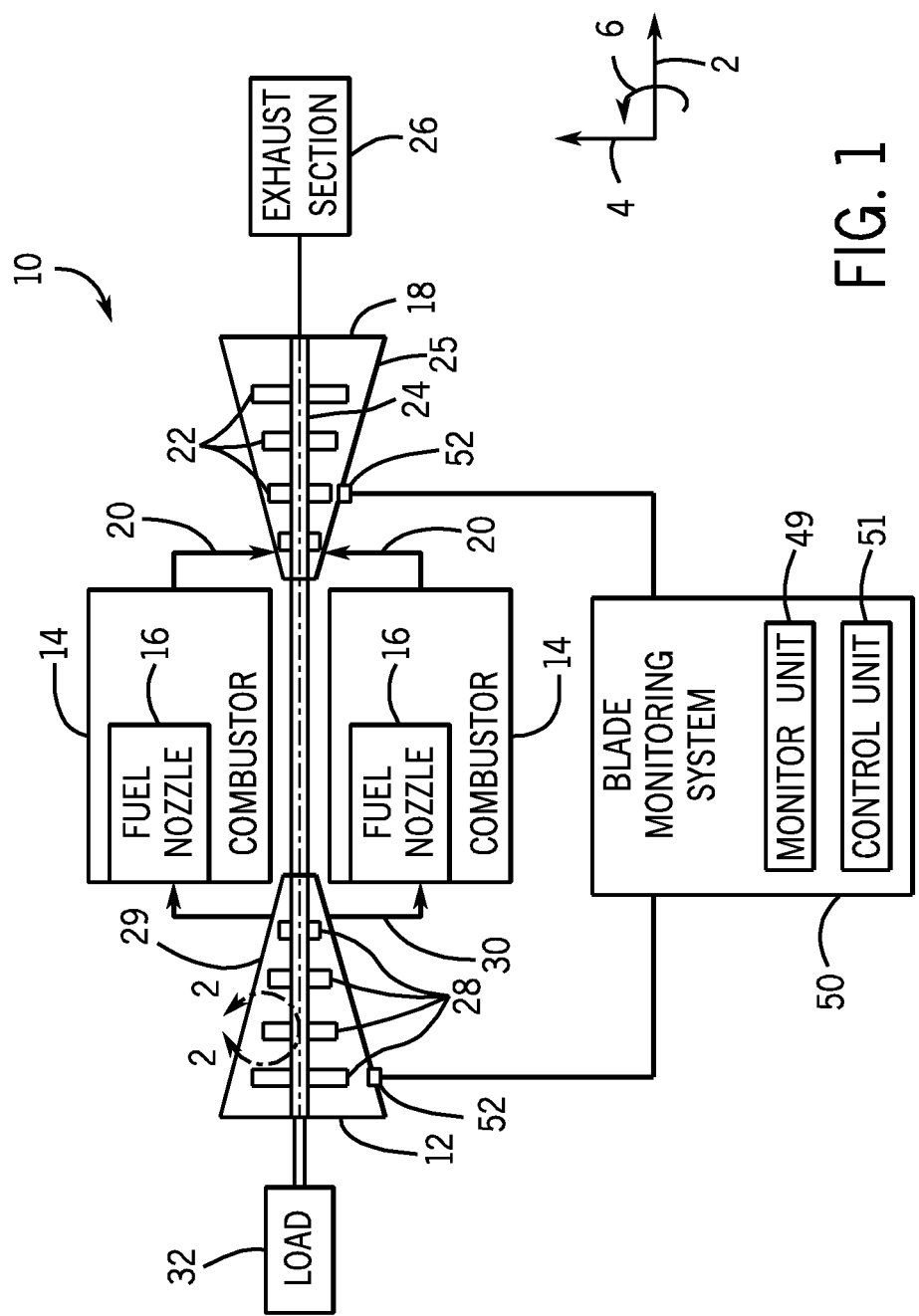
FIG. 1 is a schematic of a gas turbine engine.

FIG. 1 illustrates a block diagram of an embodiment of a gas turbine system 10 having a compressor section 12 (e.g., a compressor) and a turbine section 18 (e.g., a turbine) with an improved blade monitoring system 50 (e.g., including a monitor unit 49, a control unit 51, and a probe 52). The system 10 also includes combustors 14 having fuel nozzles 16. The fuel nozzles 16 route a liquid fuel and/or gas fuel, such as natural gas or syngas, into the combustors 14. The combustors 14 ignite and combust a fuel-air mixture that may be mixed within the combustor 14, and then pass hot pressurized combustion gases 20 (e.g., exhaust) into the turbine section 18.

Turbine blades 22 are coupled to a rotor 24, which is also coupled to several other components throughout the turbine system 10, as illustrated. The turbine section 18 also includes a turbine casing 25, which supports blade monitoring probes 52 (e.g., eddy current proximity probes or microwave proximity probes) of the blade monitoring system 50, as described in further detail below. As the combustion gases 20 pass through the turbine blades 22 in the turbine section 18, the turbine section 18 is driven into rotation, which causes the rotor 24 to rotate. Eventually, the combustion gases 20 exit the turbine section 18 via an exhaust outlet 26.

The compressor section 12 includes compressor blades 28 surrounded by a compressor casing 29. The blades 28 within the compressor section 12 are coupled to the rotor 24, and rotate as the rotor 24 is driven into rotation by the turbine section 18, as discussed above. The blade monitoring system 50 may further be used to monitor the health or operation of the compressor blades 28. As the blades 28 rotate within the compressor section 12, the blades 28 compress air from an air intake into pressurized air 30, which may be routed to the combustors 14, the fuel nozzles 16, and other portions of the gas turbine system 10.

The fuel nozzles 14 may then mix the pressurized air 30 and fuel to produce a suitable fuel-air mixture, which combusts in the combustors 14 to generate the combustion gases 20 to drive the turbine section 18. Further, the rotor 24 may be coupled to a load 32, which may be powered via rotation of the rotor 24. By way of example, the load 32 may be any suitable device that may generate power via the rotational output of the turbine system 10, such as a power generation plant or an external mechanical load. For instance, the load 32 may include an electrical generator, a fan of an aircraft engine, and so forth.

In the following discussion, reference may be made to an axial direction 2, a radial direction 4, and a circumferential direction 6. More specifically, the axial direction 2, a radial direction 4, and a circumferential direction 6 may refer to various directions relative to the rotor 24.

The blade monitoring system 50 includes the monitor unit 49 and the control unit 51. The blade monitoring system 50 (e.g., the monitor unit 49) may monitor the health of the turbine blades 22 and/or the compressor blades 28 of the gas turbine system 10. For example, monitoring blade health may include monitoring defects, vibrations, frequencies, or other characteristics of the turbine blades 22 and/or compressor blades 28. As will be appreciated, the blade characteristics monitored by the blade monitoring system 50 may vary depending on the type of blade being monitored (e.g., turbine blades 22 or compressor blades 28). Additionally, the blade monitoring system 50 (e.g., the monitor unit 49) may monitor a clearance between the turbine blades 22 and the turbine casing 25 and/or a clearance between the compressor blades 28 and the compressor casing 29. Furthermore, the blade monitoring system 50 (e.g., the control unit 51) may regulate, modify, or control the operation of the gas turbine system 10 (e.g., the compressor section 12 and/or the turbine section 18) based on the data monitored by the blade monitoring system 50 (e.g., the monitor unit 49). While the embodiments of the blade monitoring system 50 discussed below are described in the context of the turbine section 18, it is important to note that the blade monitoring system 50 may be used with the compressor section 12 or other turbomachine.

Figure 2:
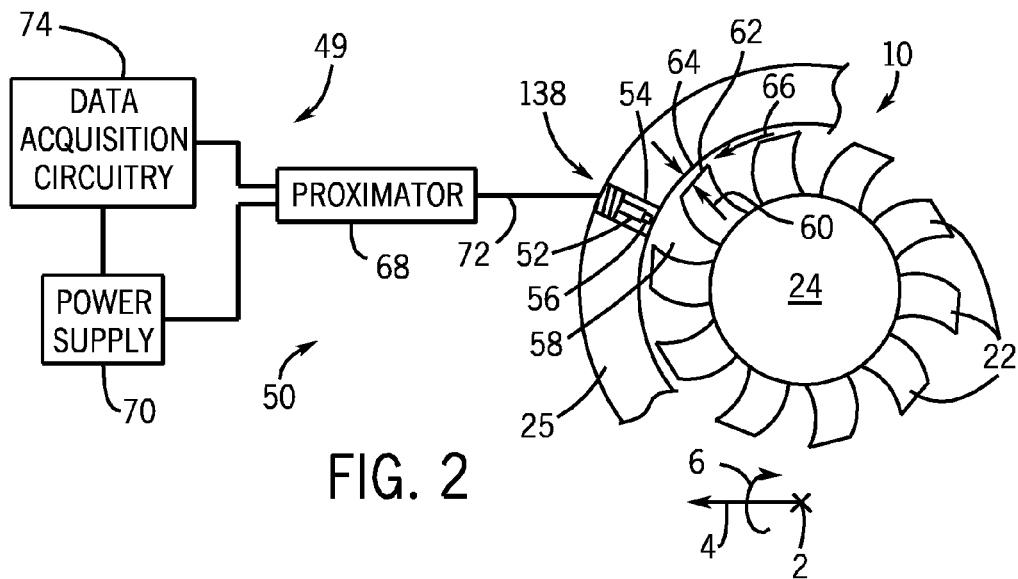
FIG. 2 is a schematic of a turbomachine blade monitoring system, in accordance with embodiments of the present disclosure.

FIG. 2 is a schematic illustrating an embodiment of a blade monitoring system 50 (e.g., the monitor unit 49), which may be used with the compressor section 12 and the turbine section 18 or other turbomachines. The blade monitoring system 50 includes the probe 52, such as an eddy current proximity probe in the illustrated embodiment, of a proximity probe sensor assembly 138 disposed within the turbine casing 25 surrounding the turbine blades 22 and the rotor 24. Specifically, the probe 52 is disposed in an aperture 54 of the turbine casing 25, which extends entirely through the turbine casing 25 in the radial direction 4. In this manner, a probe tip 56 of the probe 52 faces an interior 58 of the turbine section 18. In certain embodiments, the probe 52 may be an eddy current probe or microwave proximity probe having a non-metallic shroud around the probe tip 56, as described below. As will be appreciated, eddy current probes may not be susceptible to magnetic fields and may not induce magnetic fields significant enough to affect the blades 22 of the turbine section 18 or other electronics of the turbine section 18 or the gas turbine system 10.

Unlike magnetic pickup probes, eddy current probes may be configured to measure a clearance 60 (e.g., a radial 4 distance relative to the probe sensor) between an outer radial edge 62 of the turbine blade 22 and an inner wall 64 of the casing 25. For example, changes in the impedance of a wire coil of an eddy current probe may indicate a change in the clearance 60 between an outer radial edge 62 of the turbine blade 22 and an inner wall 64 of the casing 25. In certain embodiments, the impedance change of a wire coil of an eddy current probe may be converted to a voltage output (e.g., by the monitor unit 49), which may change in amplitude in response to a change in the clearance 60. While the illustrated embodiment shows one probe 52, the blade monitoring system 50 may include multiple probes 52 disposed within the turbine casing 25 of the turbine section 18. As discussed in detail below, the probe 52 may include sheaths, shrouds, or other components to fit the probe 52 into exiting apertures 54 of the turbine casing 25, as well as improve the life and operation of the probe 52.

In operation, the probe 52 is configured to detect the time of arrival and the time of departure of each of the turbine blades 22 as the turbine blades 22 rotate in a circumferential direction 66 within the turbine casing 25. For example, the probe 52 may be configured to induce eddy currents to detect the arrival and departure of each turbine blade 22 as each blade 22 passes the probe tip 56 of the probe 52. More specifically, a proximator 68 powered by a power supply 70 of the blade monitoring system 50 drives the probe 52 by providing a driving signal to the probe 52. In certain embodiments, the proximator 68 may be configured to drive an eddy current probe. For example, the frequency response of the proximator 68 may be increased or enhanced such that it is greater than the passing frequency of the turbine blades 22. In response to the driving signal, the probe 52 sends a return signal to the proximator 68. Indeed, in embodiments where the probe 52 is an eddy current probe, the return signal may have a more consistent amplitude for a wide range of turbine blade 22 speeds. As shown, the proximator 68 is coupled to the probe 52 by a probe cable 72, which may be adjusted or "tuned" for use with the proximator 68. That is, the cable 72 may be configured to match the impedance of the probe 52 to the proximator 68. In certain embodiments, the probe cable 72 may be approximately 1 to 20 meters long. In embodiments where the probe cable 72 is more than 5 meters long, an extension cable may be used to couple the probe 52 to the proximator 68.

The proximator 62 is further coupled to data acquisition circuitry 74, which is also powered by the power supply 70. As mentioned above, the probe 52 sends a return signal to the proximator 68. As each turbine blade 22 passes the probe tip 56 of the probe 52, the return signal provided by the probe 52 transmits a peak or "blip" in the return signal. The data acquisition circuitry 74 monitors the return signal received by the proximator 68 and assigns a time stamp to each peak or "blip" transmitted in the return signal. In other words, each time a turbine blade 22 passes the probe tip 56 of the probe 52, the time at which the blade 22 passes the probe tip 56 is recorded. In this manner, an interval of elapsed time between the passing of the turbine blades 22 may be calculated. The interval of elapsed time between turbine blade 22 passes may remain generally constant in the absence of turbine blade 22 deflection, cracking, and the like. However, a deviation in the interval of elapsed time between turbine blade 22 passes may be indicative of turbine blade 22 deflection, cracking, or other turbine blade 22 degradation. In this manner, the health of the turbine blades 22 may be monitored by the blade monitoring system 50.

Figure 3:
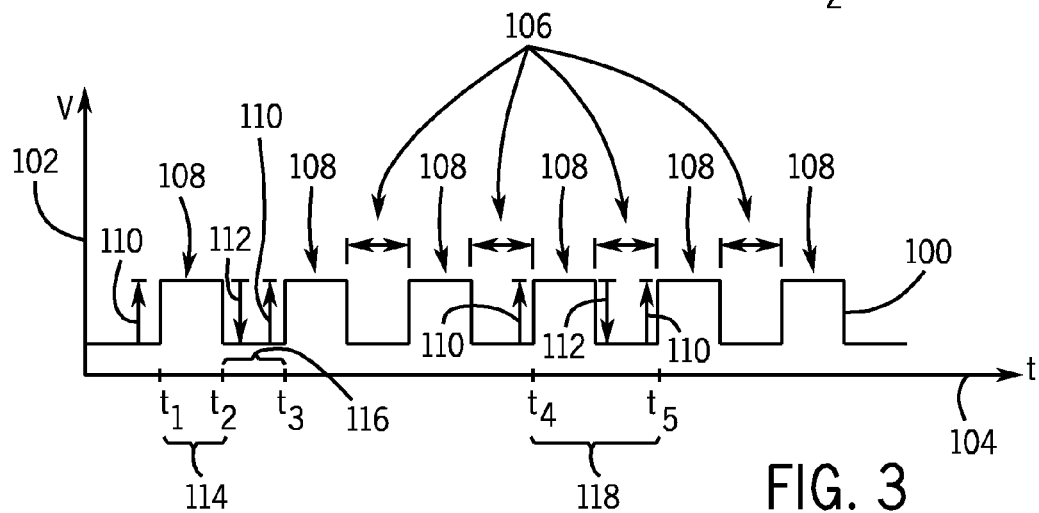
FIG. 3 is a graph illustrating turbine blade arrival and departure data acquired by the turbomachine blade monitoring system, in accordance with embodiments of the present disclosure.
Figure 4:
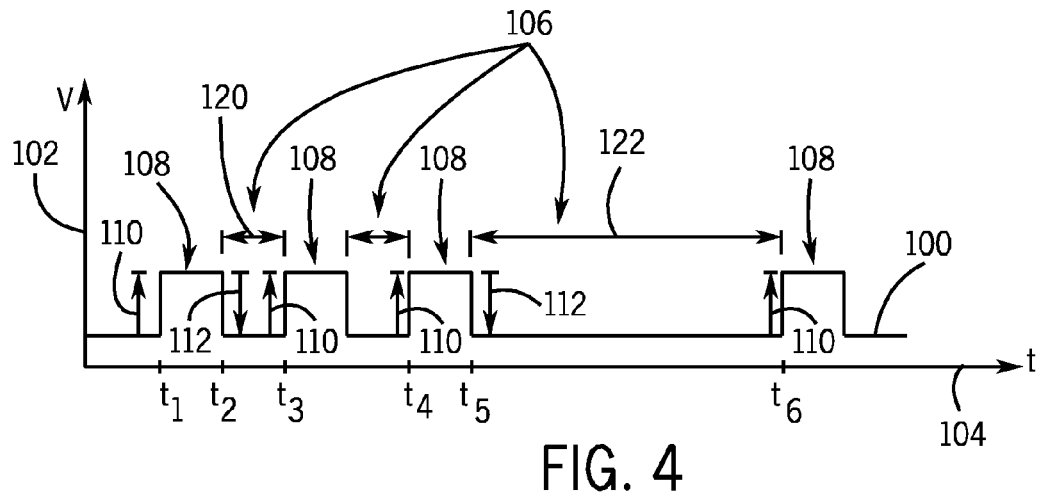
FIG. 4 is a graph illustrating turbine blade arrival and departure data acquired by the turbomachine blade monitoring system, in accordance with embodiments of the present disclosure.

FIGS. 3 and 4 are graphs illustrating an embodiment of a return signal 100 generated by the probe 52 to the proximator 68, expressed as a voltage 102 as a function of time 104. More specifically, the graphs of the return signal 100 shown in FIGS. 3 and 4 illustrate intervals of elapsed time between the passing of the turbine blades 22. For example, FIG. 3 illustrates the return signal 100 where an interval 106 of time 104 elapsed between the passing of each turbine blade 22 is constant. As mentioned above, the interval 106 of time 104 elapsed between the passing of each turbine blade 22 is calculated as the time 104 elapsed between each peak 108 or "blip" in the return signal 100.

By way of example, at a time $t_1$, the return signal 100 transmits a voltage increase 110. As will be appreciated, the voltage increase 110 is indicative of the arrival of the turbine blade 22. In other words, at the time $t_1$, the turbine blade 22 is beginning to pass the probe tip 56 of the probe 52. At a time $t_2$, the return signal 100 transmits a voltage decrease 112. The voltage decrease 112 indicates the departure of the turbine blade 22. That is, the turbine blade 22 has completely passed the probe tip 56 of the probe 52 at the time $t_2$. In other words, the turbine blade 22 is passing the probe tip 56 of the probe 52 during a time 114 elapsing between the time $t_1$ and the time $t_2$. Subsequently, at a time $t_3$, the return signal 100 transmits the voltage increase 110, indicating that the next turbine blade 22 coupled to the rotor 24 begins to pass the probe tip 56 of the probe 52. As will be appreciated, during a time 116 between the time $t_2$ and the time $t_3$ (i.e., the interval 106) no turbine blade 22 is passing the probe tip 56 of the probe 52.

In certain embodiments, the time elapsed between the arrival of the turbine blades 22 may be calculated and monitored to evaluate turbine blade 22 health. For example, at a time $t_4$, the return signal 100 transmits the voltage increase 110, thereby creating the peak 108 in the return signal 100 and indicating the arrival of the turbine blade 22. Similarly, at a time $t_5$, the return signal 100 again transmits the voltage increase 110, creating the peak 108 in the return signal 100 and indicating the arrival of the next turbine blade 22. A time 118 between the time $t_4$ and the time $t_5$ (i.e., the time elapsed between the respective arrivals of successive turbine blades 22) may be defined as an interval that may be monitored to evaluate turbine blade 22 health.

As mentioned above, the intervals 106 (i.e., the elapsed time between the turbine blades 22 passing the probe tip 56 of the probe 52) between peaks 108 in the return signal 100 illustrated in FIG. 3 remain generally constant if the blades 22 are in good health. For example, the consistency of the intervals 106 may be indicative that the turbine blades 22 may not be deflecting, cracked, and so forth. However, variations in the intervals 106 and/or 188 may be indicative of reduced health of the blades 22.

FIG. 4 illustrates the return signal 100 generated by the probe 52, where the intervals 106 of elapsed time between the passing of the turbine blades 22 is not constant. For example, at a time $t_1$, the return signal 100 transmits the voltage increase 110, thereby creating the peak 108 in the return signal 100 and indicating the arrival of the turbine blade 22 at the probe tip 56. At a time $t_2$, the return signal 100 transmits the voltage decrease 112, indicating the departure of the turbine blade 22 from the probe tip 56. Subsequently, at a time $t_3$, the return signal 100 again transmits the voltage increase 110, indicating the arrival of the next turbine blade 22 at the probe tip 56. Consequently, a first interval 120 between passing turbine blades 22 may be defined as the time elapsed between the time $t_2$ and the time $t_3$. Similarly, at a time $t_4$, the return signal 100 transmits the voltage increase 110, indicating the arrival of the turbine blade 22 at the probe tip 56. At a time $t_5$, the return signal 100 transmits the voltage decrease 112, indicating the departure of the turbine blade 22 from the blade tip 56. Subsequently, at a time $t_6$, the return signal 100 again transmits the voltage increase 110, indicating the arrival of the next turbine blade 22. As a result, a second interval 122 between passing turbine blades 22 may be defined as the time elapsed between the time $t_5$ and the time $t_6$. The first interval 120 and the second interval 122 are not equal. Therefore, one or more of the turbine blades 22 may be experiencing deflection, cracking, or other symptom indicative of turbine blade 22 degradation.

Figure 5:
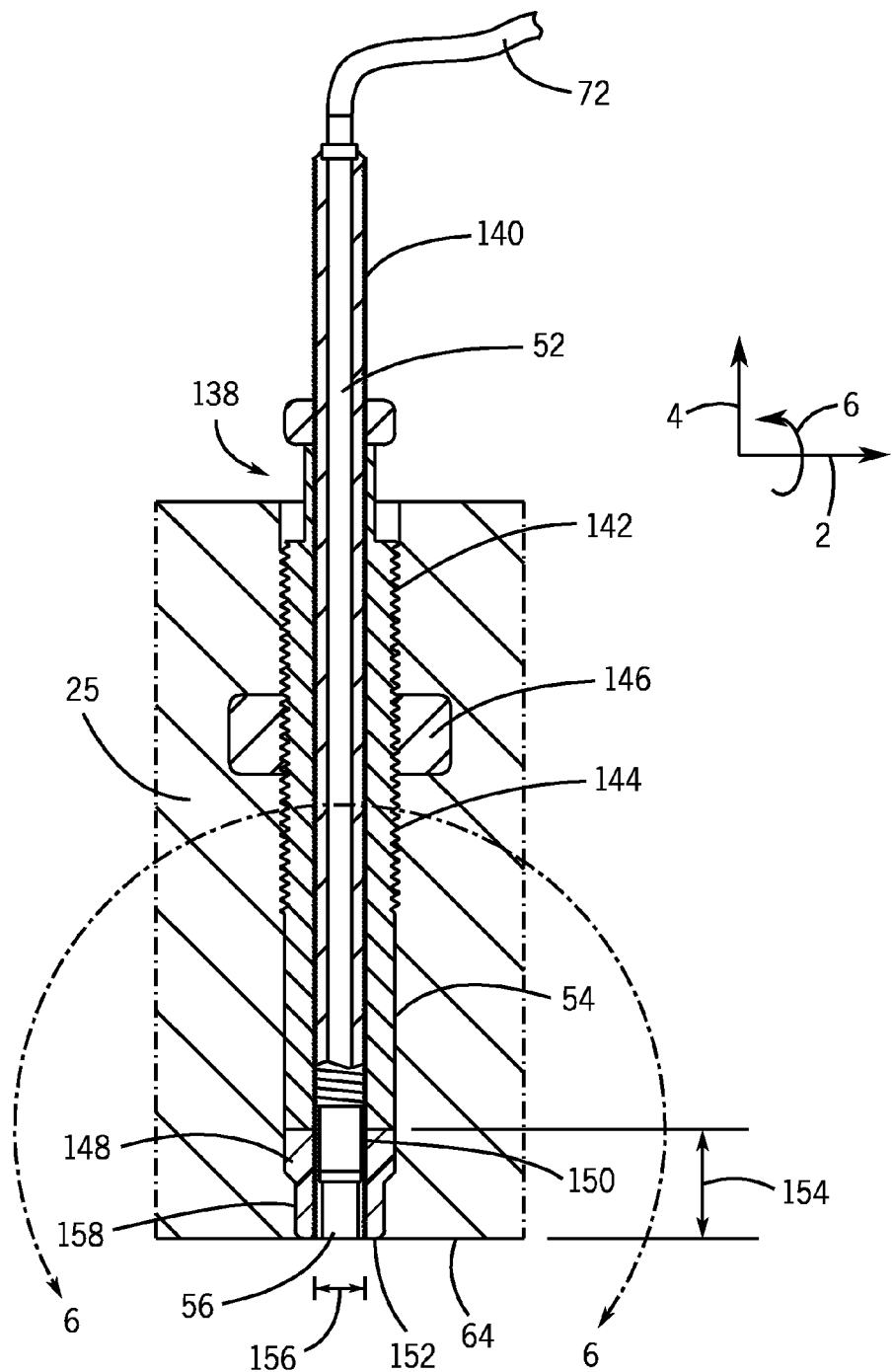
FIG. 5 is a cross-sectional view of an embodiment of an eddy current probe assembly for the turbomachine blade monitoring system.

FIG. 5 is a cross-sectional view of an embodiment of a proximity probe sensor assembly 138 disposed within the turbine casing 25. The proximity probe sensor assembly 138 includes the probe 52 disposed within a probe case 140 (e.g., annular cases), which may be made of a metal, such as stainless steel. The probe case 140 is further disposed within a probe sheath 142 (e.g., annular sheath). The probe sheath 142 is disposed within the aperture 54 formed in the turbine casing 25 of the turbine section 18. More specifically, the probe sheath 142 is coupled to the turbine casing 25 of the turbine section 18 by a threaded connection 144 (e.g., male threads of the sheath 142 and female threads of the aperture 54). In certain embodiments, an adhesive, sealant, thread locking material, or other surface treatment may be disposed between the probe sheath 142 and the turbine casing 25 at the threaded connection 144. Additionally, a jam nut 146 is disposed about the probe sheath 142 and adjacent to the turbine casing 25 to further secure the probe 52 within the aperture 54 of the casing 25. Other embodiments of the probe assembly 140 may not include the probe sheath 142.

A probe tip shroud 148 (e.g., annular shroud) is disposed about the probe tip 56 of the probe 52. More specifically, the probe tip shroud 148 is at least partially secured to the probe case 140 by a threaded connection 150 (e.g., male threads of the probe case 140 and/or probe tip 56, and female threads of the probe tip shroud 148). For example, the probe tip shroud 148 may be threaded over the probe case 140 and held in place with a thread locking material, epoxy, or other adhesive. In certain embodiments, the probe tip shroud 148 may be formed from a non-metallic material, such as a ceramic, composite, or plastic. For example, the probe tip shroud 148 may be formed from a carbon fiber, polyphenyline sulfide, fiberglass, PEEK, or other plastics. For further example, the probe tip shroud 148 may be made from carbon fiber or other composite material. As will be appreciated, for an eddy current probe, the probe tip 56 is surrounded by a non-metallic volume (e.g., shroud 148) to avoid interferences with the operation of the probe 52. However, without the non-metallic probe tip shroud 148 disposed about the probe tip 56, an empty space or void may exist between the probe tip 56 and the casing 25 of the turbine. Such a void may cause flow disturbances within the turbine section 18. Consequently, the probe tip shroud 148, formed from a non-metallic material, is disposed about the probe tip 56 and fills the void. Indeed, as shown, the probe tip shroud 148 abuts the probe sheath 142 and extends from the probe sheath 142 approximately to the inner wall 64 of the casing 25. In this manner, the inner wall 64 of the turbine casing 25 and a radial end 152 of the probe tip shroud 148 are approximately flush (e.g., no remaining recesses into the wall 64), thereby reducing flow disturbances within the turbine section 18.

In the illustrated embodiment, the probe tip shroud 148 has a radial length 154. In other words, the radial distance that the probe tip shroud 148 extends from the probe sheath 142 to the inner wall 64 of the turbine casing 25 is the length 154. In certain embodiments, the length 154 of the probe tip shroud 148 may be approximately equal to a diameter 156 of the probe tip 56. In other embodiments, the length 154 of the probe tip shroud 148 may be significantly greater than the diameter 156 of the probe tip 56, as described in detail below with regard to FIG. 6.

As mentioned above, the probe tip shroud 148 may be formed from carbon fiber, polyphenyline sulfide, fiberglass, PEEK, or other plastics. As will be appreciated, such materials may be resistant to fracture or failure at extreme temperatures and vibrations. Similarly, such materials may not be brittle, and may have compressive qualities. Consequently, the likelihood of the probe tip shroud 148 fracturing and partially or completely falling into the turbine section 18 is reduced. To further block the probe tip shroud 148 from fracturing and/or falling into the turbine section 18, the aperture 54 in the turbine casing 25 may have a smaller or tapered portion 158 at the probe tip 56. That is, the tapered portion 158 has a reduced diameter to help retain the probe tip shroud 148 within the aperture 54 and block the probe tip shroud 148 from falling into the turbine section 18. Additionally, the tapered portion 158 may help with alignment to position the probe tip 56 and the probe tip shroud 148 flush with the inner wall 64 of the casing 25.

Figure 8:
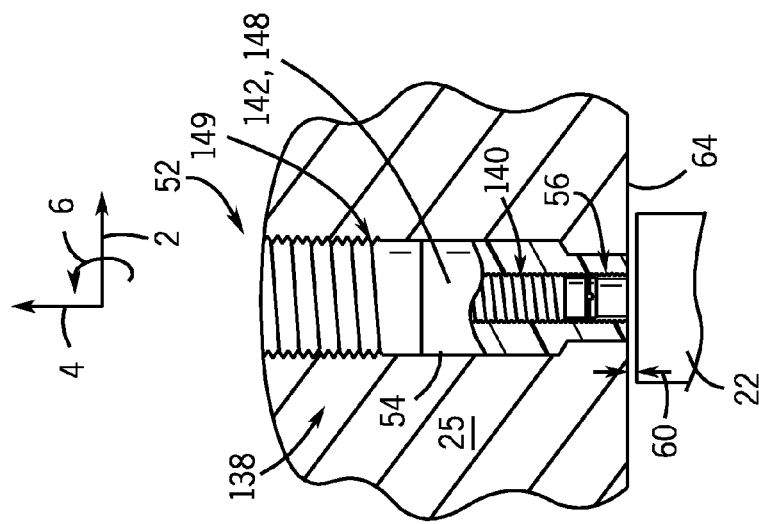
FIG. 8 is a partial cross-sectional view of an embodiment of an eddy current probe assembly for the turbomachine blade monitoring system.
Figure 7:
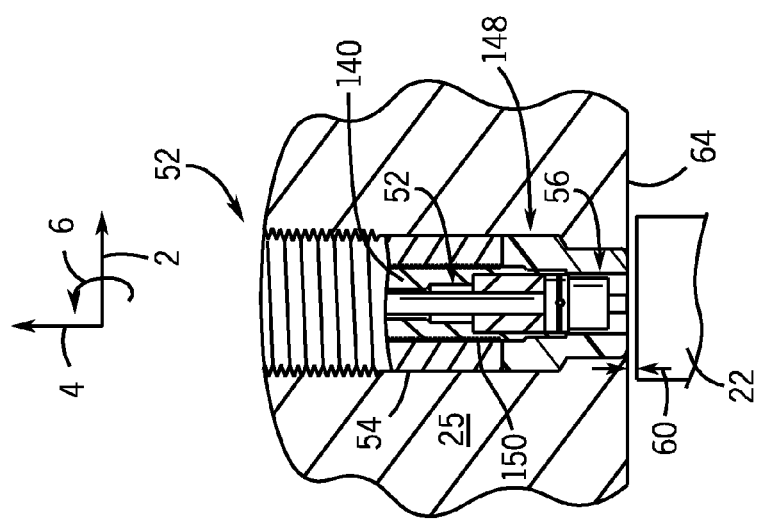
FIG. 7 is a partial cross-sectional view of an embodiment of an eddy current probe assembly for the turbomachine blade monitoring system.
Figure 6:
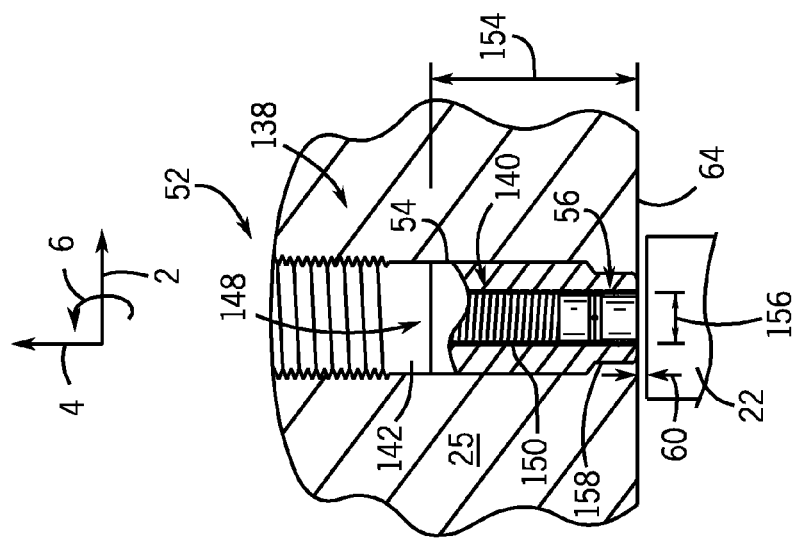
FIG. 6 is a partial cross-sectional view of an embodiment of an eddy current probe assembly for the turbomachine blade monitoring system.

FIGS. 6-8 are partial cross-sectional side views, taken within line 6-6 of FIG. 5, of the proximity probe sensor assembly 138 disposed within the aperture 54 of the turbine casing 25. Specifically, as mentioned above, FIG. 6 illustrates an embodiment of the probe tip shroud 148, where the length 154 of the probe tip shroud 148 is significantly greater than the diameter 156 of the probe tip 56. Indeed, the probe tip shroud 148 has a "tall" configuration and extends radially about a greater portion of the probe case 140 than the embodiment illustrated in FIG. 5. In other words, the threaded connection 150 between the probe tip shroud 148 and the probe case 140 is greater in the illustrated embodiment of FIG. 6 than the embodiment shown in FIG. 5. Such an embodiment may help further secure the probe tip shroud 148 to the probe case 140. For example, a ratio of the radial length 154 to the diameter 156 may range between approximately 1:1 to 10:1, 1.5:1 to 5:1, or 2:1 to 3:1.

FIG. 7 illustrates an embodiment of the proximity probe sensor assembly 138, where the probe tip shroud 148 is overmolded about the probe case 140 and the probe tip 56. In other words, the probe tip shroud 148 is formed using a non-metallic material, such as carbon fiber, polyphenyline sulfide, fiberglass, PEEK, or other plastics, that is molded over the probe case 140 containing the probe 52. Thus, the probe tip shroud 148 is directly affixed to the case 140 and probe tip 56. FIG. 8 illustrates an embodiment of the proximity probe sensor assembly 138, where the probe sheath 142 and the probe tip shroud 148 are integrated together (e.g., one annular piece 149) and are formed from a non-metallic material, such as carbon fiber, polyphenyline sulfide, fiberglass, PEEK, or other plastics. In other words, the probe sheath 142 is formed from a non-metallic material, extends over, and is threaded with the probe case 140 and the probe tip 56 of the probe 52.

Embodiments of the present disclosure are directed towards the blade monitoring system 50 including the proximity probe sensor assembly 138 disposed within the turbine casing 25 of the turbine section 18. In other embodiments, the blade monitoring system 50 may be disposed within the compressor casing 29 of the compressor section 12. The proximity probe sensor assembly 138 includes the probe 52 (e.g., an eddy current probe or microwave proximity probe) having a probe tip 56 surrounded by a probe tip shroud 148 (e.g., annular shroud). Specifically, the probe tip shroud 148 is formed from a non-metallic material, such as carbon fiber, polyphenyline sulfide, fiberglass, PEEK, or other plastics, and may extend from the probe sheath 142 to the inner wall 64 of the turbine casing 25 when the proximity probe sensor assembly 138 is disposed within the aperture 54 of the casing 25. In this manner, the probe tip shroud 148 fills an empty space or void that would otherwise exist between the probe tip 56 and the turbine casing 25 when the proximity probe sensor assembly 138 is installed in the turbine casing 25, thereby enabling the use of eddy current probes to monitor turbine blade 22 health, while reducing flow disturbances within the turbine section 18. Additionally, while the embodiments disclosed above are described in the context of the turbine section 18, the blade monitoring system 50 may be used with other turbomachines, such as steam turbines, hydroturbines, pumps, compressors, or other turbomachines.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A turbomachine blade monitoring system, comprising:
an eddy current proximity probe assembly, comprising:
an eddy current proximity probe having a probe tip;
a probe case disposed at least partially about the eddy current proximity probe;
a probe sheath at least partially disposed about the probe case, wherein the probe sheath is coupled to the probe case by a first threaded connection; and
a probe tip shroud disposed about a circumference of the probe tip, wherein the probe tip shroud is coupled to the probe case by a second threaded connection, the probe tip shroud is configured to fill a gap between the probe tip and a turbomachine casing when the eddy current proximity probe assembly is coupled to the turbomachine casing, and the probe tip shroud comprises a non-metallic material; and
a monitor coupled to the eddy current proximity probe assembly, wherein the monitor is configured to monitor an interval of elapsed time between passing of a first turbomachine blade and a second turbomachine blade based on a signal provided by the eddy current proximity probe, wherein the signal is indicative of a presence of the first turbomachine blade or the second turbomachine blade.

2. The system of claim 1, comprising a signal driver coupled to the eddy current proximity probe with a probe cable, wherein the signal driver is configured to provide excitation signals to the eddy current proximity probe.

3. The system of claim 2, comprising data acquisition circuitry coupled to the signal driver, where the data acquisition circuitry is configured to monitor an amplitude of a return signal generated by the eddy current proximity probe and associate each peak of the amplitude with a time stamp indicating a time of each peak.

4. The system of claim 1, wherein the probe tip shroud abuts the probe sheath disposed about the eddy current proximity probe, wherein the probe tip shroud is configured to extend from the probe sheath to an inner wall of the turbomachine casing when the eddy current proximity probe is disposed within the turbomachine casing.

5. The system of claim 1, wherein the non-metallic material comprises a composite material.

6. The system of claim 1, wherein the eddy current proximity probe is configured to detect an arrival or a departure of the first turbomachine blade.

7. The system of claim 1, wherein the eddy current proximity probe is configured to detect a clearance between an outer radial end of the first turbomachine blade and an inner wall of the turbomachine casing.

8. The system of claim 1, comprising a controller configured to control at least one function of a turbomachine based on the interval of elapsed time, wherein the controller comprises the monitor configured to monitor the interval of elapsed time between passing of the first turbomachine blade and the second turbomachine blade based on the signal.

9. A system, comprising:
a turbomachine having a first blade and a second blade that rotate along a surface;
an eddy current proximity probe assembly, comprising:
an eddy current proximity probe having a probe tip configured to provide a signal indicative of an interval of elapsed time between passing of the first blade along the surface and passing of the second blade along the surface;
a probe case disposed at least partially about the eddy current proximity probe;
a probe sheath at least partially disposed about the probe case, wherein the probe sheath is coupled to the probe case by a first threaded connection; and
a probe tip shroud disposed about a circumference of the probe tip, wherein the probe tip shroud is coupled to the probe case by a second threaded connection, the probe tip shroud is configured to fill a gap between the probe tip and a turbomachine casing when the eddy current proximity probe assembly is coupled to the turbomachine casing, and the probe tip shroud comprises a non-metallic material; and
a controller configured to control at least one function of the turbomachine based on the interval of elapsed time.

10. The system of claim 9, wherein turbomachine comprises a turbine or a compressor, and the first and second blades are turbine blades or compressor blades.

11. The system of claim 9, wherein the non-metallic material comprises a composite material.

12. The system of claim 9, wherein the probe tip shroud is a removable annular shroud.

13. A system, comprising:
an eddy current proximity probe assembly, comprising:
an eddy current proximity probe having a probe tip;
a probe case disposed at least partially about the eddy current proximity probe;
a probe sheath at least partially disposed about the probe case, wherein the probe sheath is coupled to the probe case by a first threaded connection; and
a probe tip shroud disposed about a circumference of the probe tip, wherein the probe tip shroud is coupled to the probe case by a second threaded connection, the probe tip shroud is configured to fill a gap between the probe tip and a turbomachine casing when the eddy current proximity probe assembly is coupled to the turbomachine casing, and the probe tip shroud comprises a non-metallic material.

14. The system of claim 13, wherein a radial end of the probe tip shroud is generally flush with an inner wall of the turbomachine casing when the eddy current proximity probe assembly is disposed within an aperture of the turbomachine casing.

15. The system of claim 13, comprising a blade monitoring system having the eddy current proximity probe assembly, wherein the blade monitoring system is configured to monitor a clearance between a rotary blade and a casing and/or the blade monitoring system is configured to monitor a health of a tip portion of the rotary blade.

16. The system of claim 9, comprising a controller monitoring system configured to detect a deviation in the interval of elapsed time.

* * * * *